United States Patent
Bitterfeld et al.

(10) Patent No.: US 10,917,312 B2
(45) Date of Patent: Feb. 9, 2021

(54) GRAPHICAL USER INTERFACE FOR VALIDATION OF CREDENTIALS AND SCHEDULED DISCOVERY OF REMOTE NETWORKS

(71) Applicant: ServiceNow, Inc., Santa Clara, CA (US)

(72) Inventors: Robert Bitterfeld, Petach Tikva (IL); Tom Bar Oz, Herzliya (IL); Roy Wallerstein, Kfar—Saba (IL); Alexandra Feiguine, Sha'ar Efrayim (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/361,017

(22) Filed: Mar. 21, 2019

(65) Prior Publication Data

US 2020/0304379 A1    Sep. 24, 2020

(51) Int. Cl.
*H04L 12/24*    (2006.01)
*H04L 29/06*    (2006.01)

(52) U.S. Cl.
CPC ............ *H04L 41/22* (2013.01); *H04L 41/12* (2013.01); *H04L 41/20* (2013.01); *H04L 41/28* (2013.01); *H04L 41/5058* (2013.01); *H04L 63/083* (2013.01)

(58) Field of Classification Search
CPC ....... H04L 41/22; H04L 12/911; H04L 29/08; H04L 47/871; H04L 67/16; H04L 63/083; H04L 41/12; H04L 41/5058; H04L 41/20; H04L 41/28; G06F 9/455
See application file for complete search history.

(56) References Cited

U.S. PATENT DOCUMENTS

| | | | |
|---|---|---|---|
| 5,978,594 | A | 11/1999 | Bonnell |
| 6,321,229 | B1 | 11/2001 | Goldman |
| 6,799,189 | B2 | 9/2004 | Huxoll |
| 6,816,898 | B1 | 11/2004 | Scarpelli |

(Continued)

OTHER PUBLICATIONS (CenturyLink, When enabling Automatic Discovery of Resources, https://www.ctl.io/knowledge-base/cloud-application-manager/deploying-anywhere/using-microsoft-azure/, p. 4-5), (Year: 2018).*

(Continued)

*Primary Examiner* — Patrice L Winder
(74) *Attorney, Agent, or Firm* — Fletcher Yoder PC

(57) ABSTRACT

A computational instance of a remote network management platform may be dedicated to a managed network, and the managed network may use computing resources of a cloud-based service provider. One or more server devices may be disposed within the computational instance and configured to: (i) transmit, to a client device associated with the managed network, a representation of a pane of a graphical user interface (GUI), (ii) receive, from the client device, an indication of credentials for accessing the cloud-based service provider, (iii) validate the credentials by logging on to the cloud-based service provider with the credentials, (iv) determine that the logging on was successful, and (v) transmit, to the client device, a further pane of the GUI that allows definition of a discovery schedule with which the computational instance is to discovery computing resources of the cloud-based service provider that are associated with the managed network.

20 Claims, 13 Drawing Sheets

(56) References Cited

U.S. PATENT DOCUMENTS

| | | |
|---|---|---|
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,983 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalksi |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,137,115 B2 | 8/2015 | Apte |
| 9,098,322 B2 | 9/2015 | Mayfield |
| 9,122,552 B2 | 9/2015 | Whitney |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,491,035 B1 * | 11/2016 | Pauley ................ G06F 9/45533 |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,491,689 B2 * | 11/2019 | Kuchibhotla ....... H04L 41/0816 |
| 10,536,518 B1 * | 1/2020 | Streete .................... H04L 67/10 |
| 10,620,928 B2 * | 4/2020 | De Gaetano ............ H04L 67/10 |
| 10,652,126 B2 * | 5/2020 | Sadana ................ H04L 43/045 |
| 10,735,280 B1 * | 8/2020 | Finch ..................... H04L 67/16 |
| 2014/0365662 A1 * | 12/2014 | Dave .................. G06F 9/45533 |
| | | 709/226 |

OTHER PUBLICATIONS

Servicenow Documentation, Feb. 13, 2019.

* cited by examiner

GRAPHICAL USER INTERFACE FOR VALIDATION OF CREDENTIALS AND SCHEDULED DISCOVERY OF REMOTE NETWORKS

BACKGROUND

Cloud computing providers make computing resources (e.g., processing resources, storage, software applications, services, and/or other resources) available to users statically or on demand by way of the Internet. Such a user may have a userid and access credentials with a cloud-based provider that allows the user to remotely log on and employ these resources. As some of these resources are ephemeral (meaning that they may be allocated to and deallocated from the user based on demand or some other arrangement), it can be challenging to determine the extent of resources to which the user has access at any point in time. Further, if the user is an enterprise, the resources may be quite extensive and span multiple physical datacenter locations of the cloud-based provider.

SUMMARY

Cloud discovery involves determining the computing resources of a cloud-based service provider that are available to a particular entity. From such a discovery process, representations of the computing resources and/or related configuration details may be stored in a database as configuration items. These configuration items may then be used as the basis of information technology service and operations management, software asset management, and/or a variety of other network services and operations.

Configuration of cloud discovery involves specification of: (i) the cloud-based service provider, (ii) one or more userids and related credentials that allow the managed network to access the cloud-based service provider, (iii) datacenter locations in which to carry out cloud discovery, and (iv) a schedule according to which cloud discovery should be performed. Using this information, the specified datacenters are accessed using the userid(s) and credentials at the scheduled time(s) to determine the computing resources available to and/or assigned to a managed network.

Current graphical user interfaces (GUIs) that support configuration and operation of cloud discovery can be complex and confusing to all but the experienced user. In some cases, conventional GUIs for cloud discovery configuration may involve a single page (e.g., a web page) in which a multitude of semi-related information is entered. Or, the user might have to switch back and forth between multiple disjoint or discontinuous pages of the GUI in order to enter information that is consistent across these pages. Entry of any incorrect information can cause the cloud discovery process to fail. For instance, if the user mistypes a userid or one or more credentials, the scheduled cloud discovery procedure will be unable to log into the cloud-based service provider. But the user might not find out until hours or days later, and may not be able to easily determine why the failure has occurred.

Therefore, an improved GUI may provide a guided workflow, directing the user through a series of panes of the GUI in a logical fashion and in accordance with predefined phases. Thus, the information provided on a previous pane may influence the information requested on a subsequent pane. By walking the user through these panes, the user is less likely to become overwhelmed or to misconfigure cloud discovery. To that end, some panes may allow the user to test parts of the cloud discovery configuration before moving on to the next pane. For instance, the first pane may prompt the user to specify a userid and associated credentials, then test these parameters by using them in an attempt to log into the cloud-based service provider. If the attempt fails, the user can be immediately notified and make the appropriate remediations (e.g., typing in the correct userid and credentials). As a consequence, when cloud discovery is carried out, it is more likely to complete successfully, thus increasing the reliability of the process.

Accordingly, in a first example embodiment, persistent storage may be disposed within a computational instance of a remote network management platform, wherein the computational instance is dedicated to a managed network, and wherein the managed network uses computing resources of a cloud-based service provider. One or more server devices may be disposed within the computational instance and configured to transmit, to a client device associated with the managed network, a representation of a first pane of a GUI, wherein the first pane contains graphical elements that allow: (i) selection of the cloud-based service provider, (ii) selection of a userid and related credentials that the managed network has configured to access the cloud-based service provider, and (iii) validation of the userid and credentials. The one or more server devices may also be configured to receive, from the client device, an indication that the graphical element allowing validation of the userid and credentials was activated. The one or more server devices may further be configured to, in response to receiving the indication, validate the userid and credentials by logging on to the cloud-based service provider with the userid and credentials. The one or more server devices may further be configured to determine that logging on to the cloud-based service provider with the userid and credentials was successful. The one or more server devices may further be configured to, in response to determining that logging on to the cloud-based service provider with the userid and credentials was successful, transmit, to the client device: (i) a second pane of the GUI that allows selection of one or more datacenter locations of the cloud-based service provider, and (ii) a third pane of the GUI that allows definition of a schedule according to which the one or more server devices are to perform remote discovery of the computing resources that are at the selected datacenter locations. The one or more server devices may be configured to store, in the persistent storage, representations of the cloud-based service provider, the userid and credentials, the selected datacenter locations, and the schedule.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a method may include various steps for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
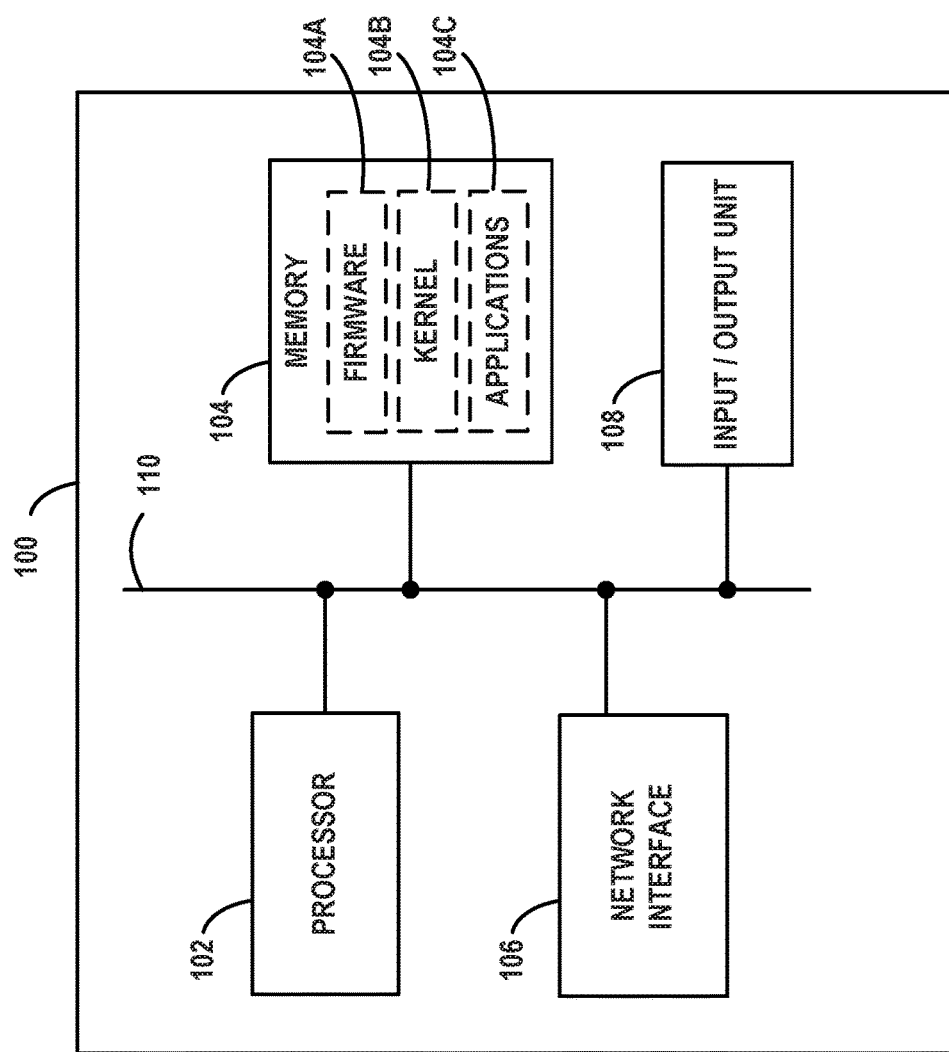
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
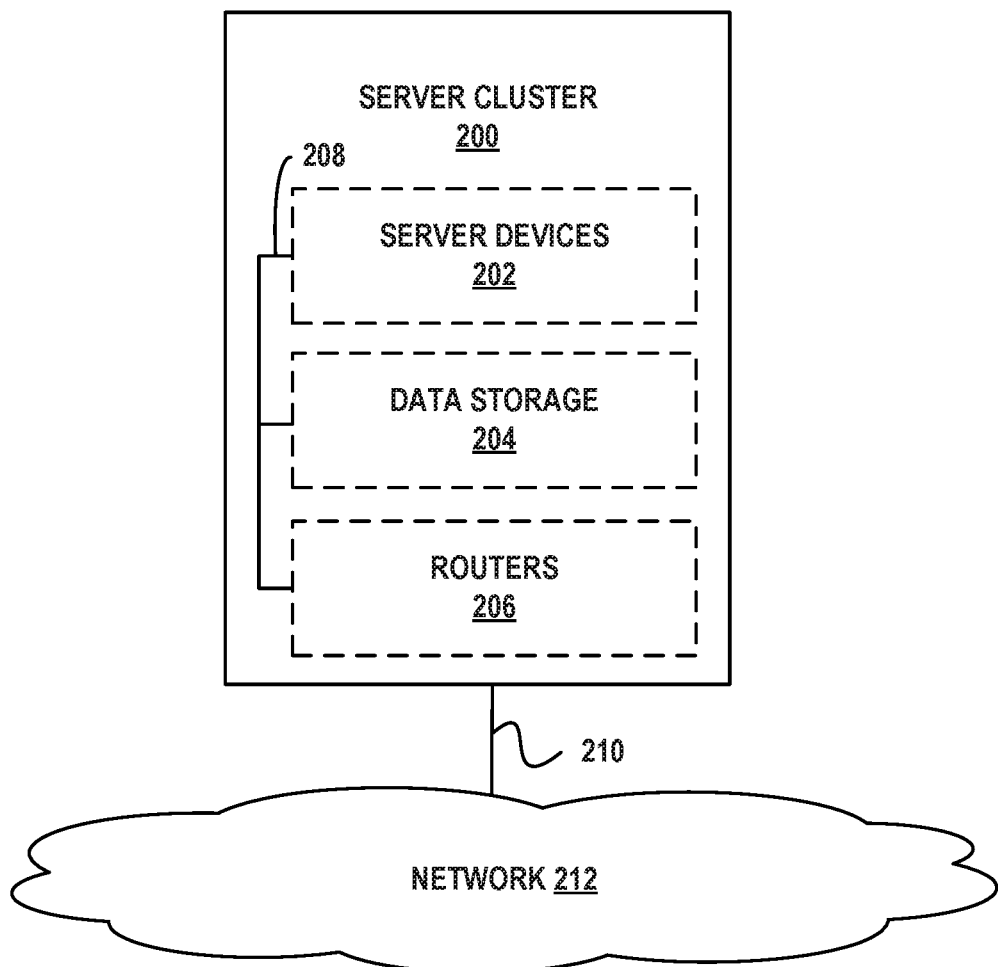
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of persistent storage or database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
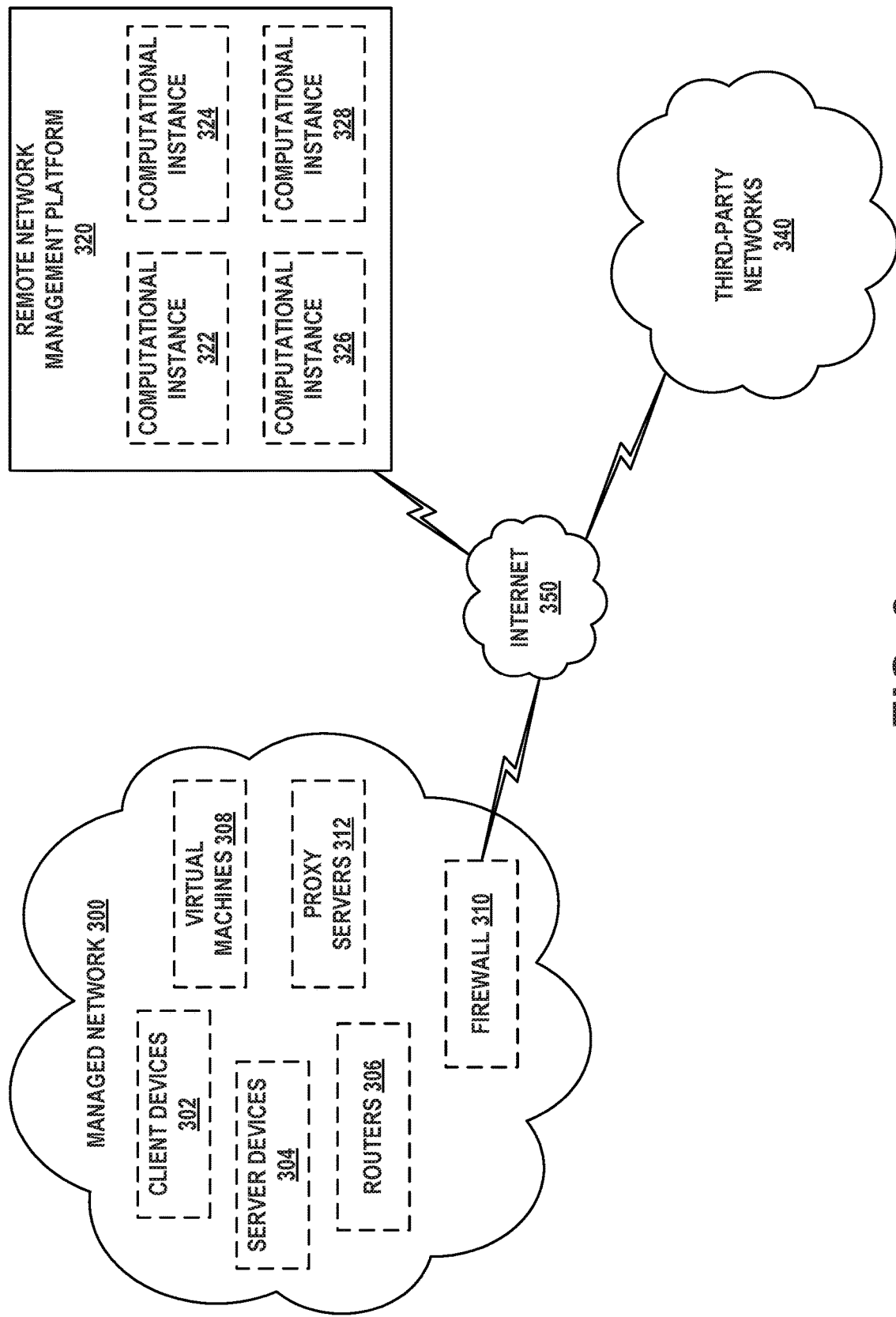
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
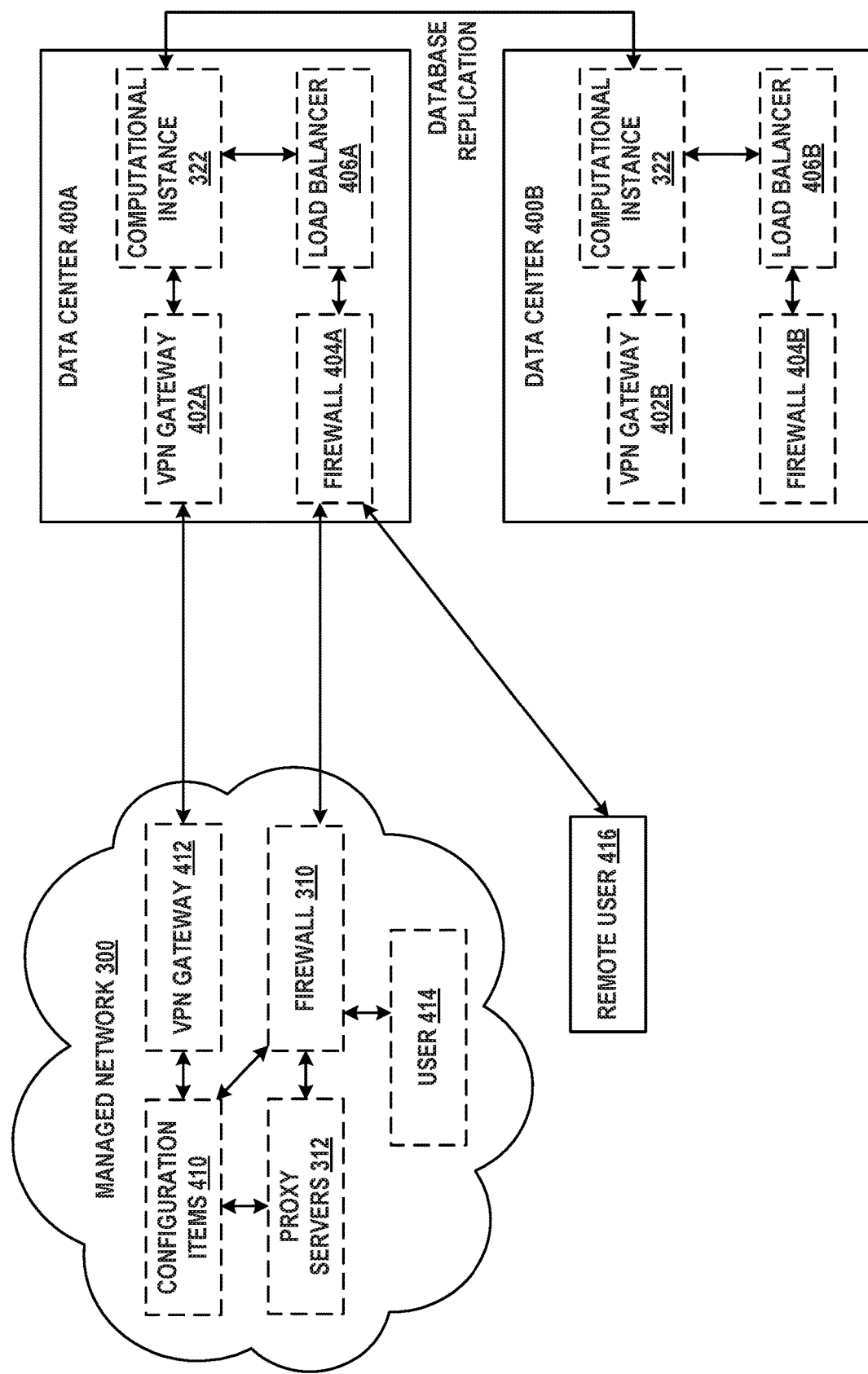
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
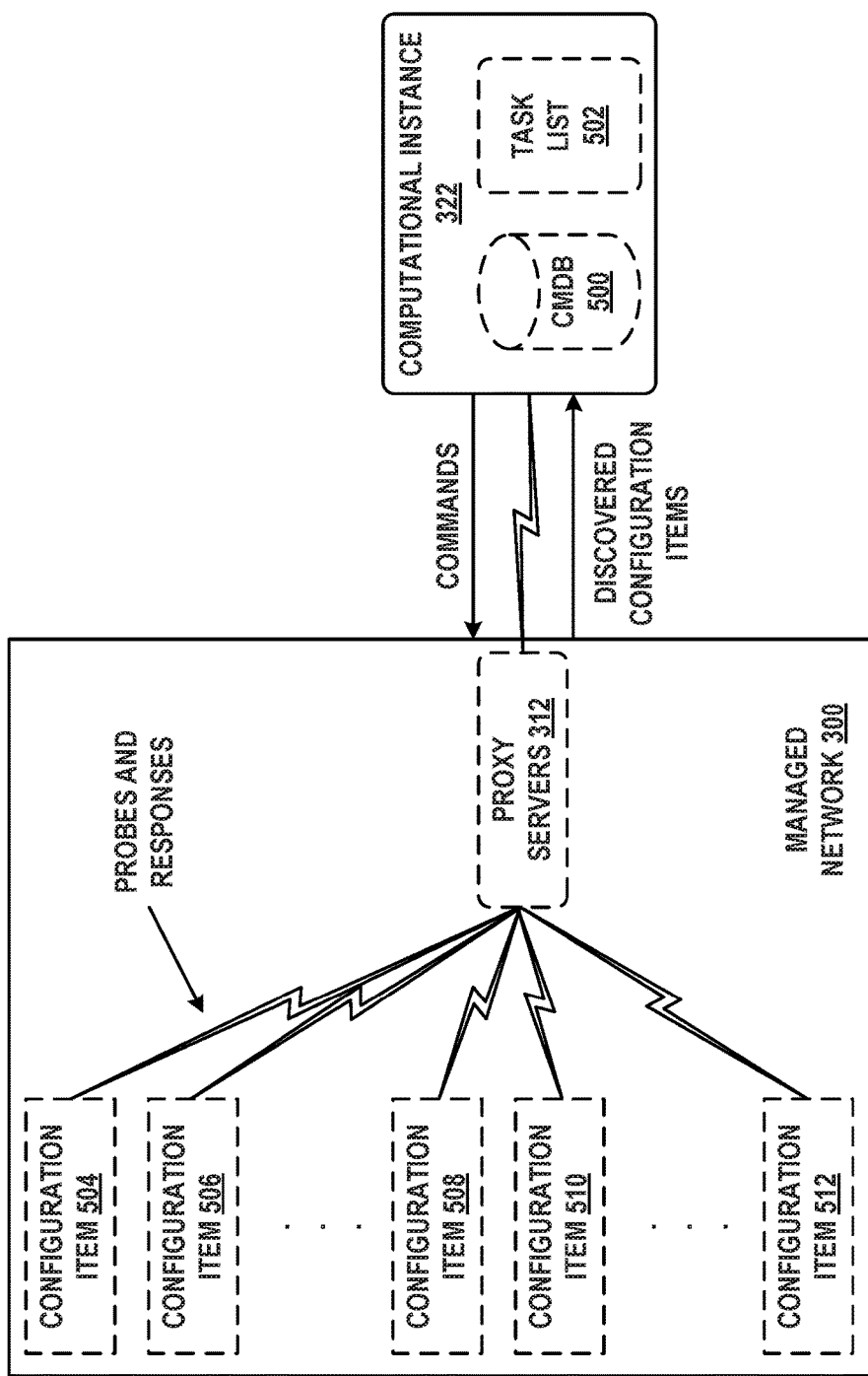
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
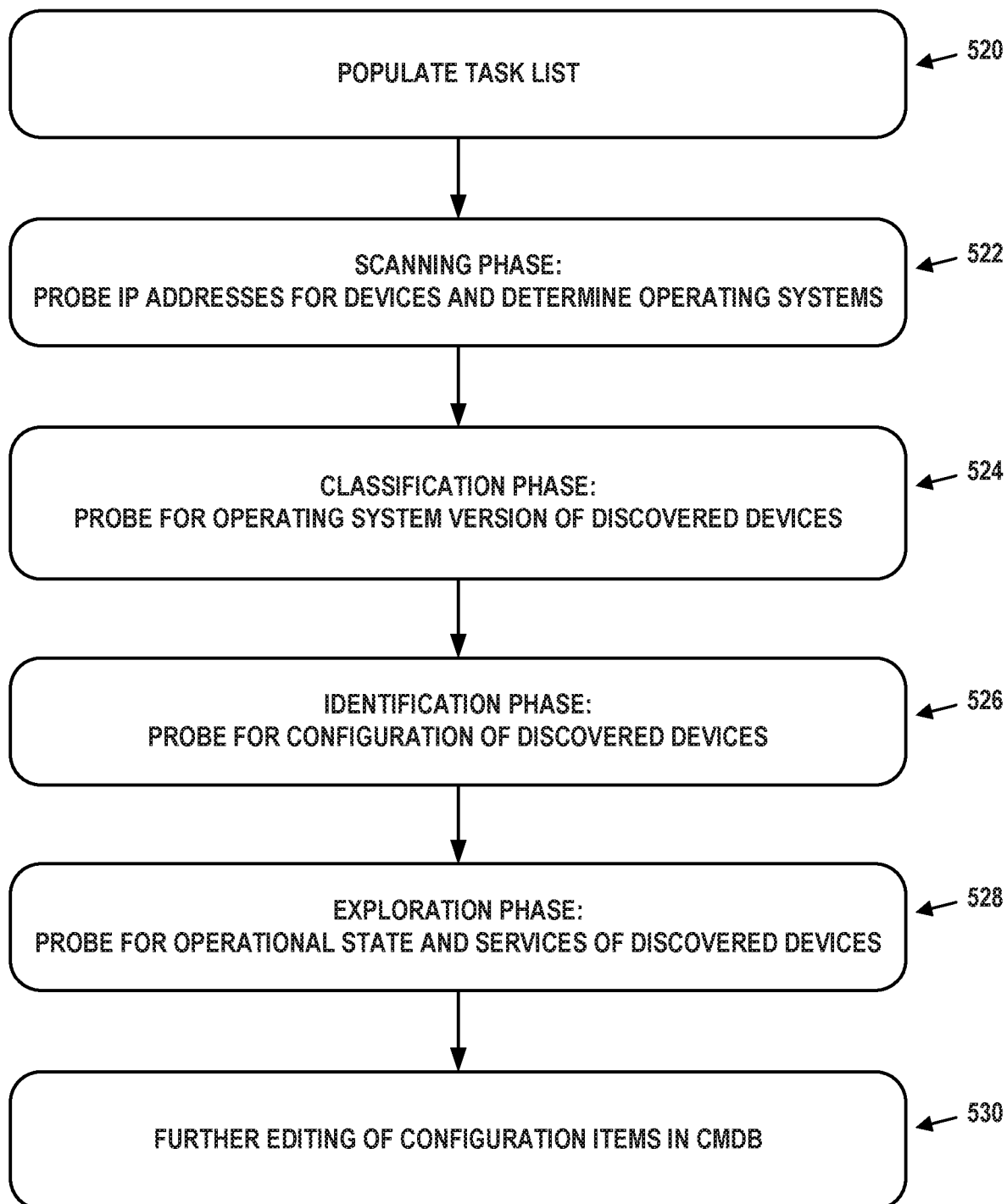
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Improved Graphical User Interfaces for Scheduling Cloud Discovery

As described herein, the term "pane" may refer to a GUI component that contains one or more locations in which to display information, and/or one or more user-selectable items such as buttons or tabs. In some embodiments, a pane may be equivalent to, or contained within, a web page, GUI display, or a GUI window, but multiple panes may exist within any of these components. Buttons and/or tabs may be graphical control elements that can be triggered to display additional information within the pane. The GUIs and/or panes described herein may be provided to users when they access a computational instance on a remote network management platform, such as computational instance 322 within remote network management platform 320 as described in FIG. 3.

As previously noted, configuration of cloud discovery by way of GUIs can be a complex and error-prone task for most users. The embodiments herein address these limitations by way of a series of GUI panes that provide a logical workflow for cloud discovery configuration. As a result of these embodiments, cloud discovery is more likely to be configured properly and more likely to operate with fewer errors. Example panes are shown in FIGS. 6A, 6B, 6C, 6D, 6E, and 6F. These panes may allow for the scheduling of cloud discovery in order to determine the computing resources of a cloud-based service provider that are available to a particular entity.

Figure 6A:
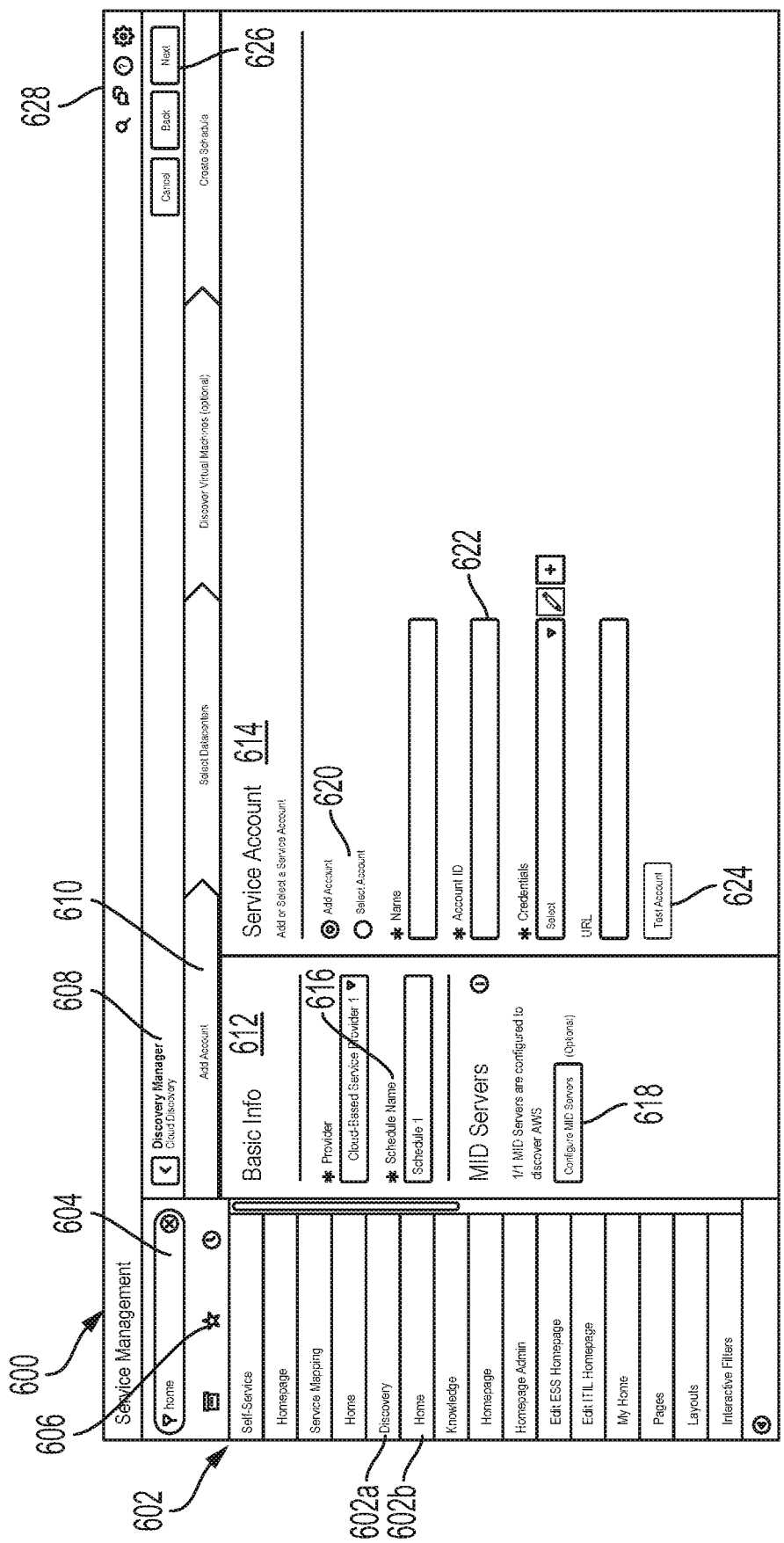
FIG. 6A depicts an account management pane of a cloud discovery management display of a GUI, in accordance with example embodiments.

FIG. 6A depicts cloud discovery management display 600 that includes navigation pane 602, navigation search bar 604, navigation filters 606, directory button 608, navigation identifiers 610, cloud information 612, account information 614, navigation button(s) 626, and pane manipulation buttons 628.

Navigation pane 602 may be a selectable menu that allows a user to navigate to different services available to maintain managed network 300, including services unrelated to cloud discovery. Navigation pane 602 includes navigation selections 602a and 602b, navigation search bar 604, and navigation filters 606. Navigation selections 602a and 602b may correspond to cloud discovery and may allow a user to quickly navigate back to cloud discovery management display 600 if the user was using a set of GUI panes related to a different service. As shown, navigation selection 602a corresponds to "Discovery" and navigation selection 602b corresponds to "Home." In operation, navigation selection 602a may take the user back to most recent view within cloud discovery management display 600, while navigation selection 602b may take the user to the cloud discovery management display 600 homepage (which is shown in FIG. 6A). Navigation search bar 604 may allow a user to enter a text string to identify the particular service the user wishes to use. Navigation filters 606 may include buttons that filter and/or sort the available selections in navigation pane 602, including a button to show saved services, a button to show favorite services, and a button to show a recent history of used services.

Directory button 608 may include a link to return the user to the most recently used GUI pane that was accessed before accessing cloud discovery management display 600. If the user wishes to access this previous GUI pane, the user may select directory button 608.

Navigation identifiers 610 may identify a particular pane of cloud discovery management display 600 the user is currently accessing. As shown, navigation identifiers 610 include identifiers for "Add Account," "Select Datacenters," "Discover Virtual Machines," and "Create Schedule." In operation, selecting one of navigation button(s) 626 may highlight one of navigation identifiers 610, indicating a switch of detailed views of cloud discovery management display 600.

In FIG. 6A, an account definition pane is displayed, as indicated by navigation identifiers 610 highlighting "Add Account". In particular, this account definition pane includes sections for specifying cloud information 612 and account information 614.

Cloud information 612 may include information fields 616 and server configuration button 618. Information fields 616 may include user-editable fields that allow a user to specify a particular cloud-based service provider and cloud discovery schedule. The user's input into information fields 616 may define aspects of the cloud discovery configuration, such as the computing resources of the selected cloud-based service provider to discover. Server configuration button 618 may configure the one or more proxy servers disposed within managed network 300 to discover computing resources related to the selected cloud-based service provider. As shown in FIG. 6A, selection of server configuration button 618 may configure the servers to discover resources relating to "Cloud-Based Service Provider 1."

Account information 614 may include account management buttons 620, account information fields 622, and test account button 624. Account management buttons 620 may allow a user to either (i) add a new account associated with the selected cloud-based service provider, or (ii) select a pre-existing account associated with the selected cloud-based service provider. Account information fields 622 may include user-editable fields that change based on the selection of account management buttons 620. For example, as shown in FIG. 6A, "Add Account" is selected in account management buttons 620, which causes cloud discovery management display 600 to display user-editable fields in account information fields 622 that allow a user to enter (i) a name of the account, (ii) an account ID (e.g., userid), (iii) account credentials, and (iv) a URL that links to external account. Account credentials may include a password, token, digital certificate, and/or an access key that is created for and maintained by the cloud-based service provider. In another example, which is not shown in FIG. 6A, if a user selects "Select Account" in account management buttons 620, account information fields 622 may provide drop-down menus instead of user-editable fields that allow a user to select a pre-existing account that is already associated with the selected cloud-based service provider. Test account button 624 may be a user-selectable button that tests the provided or selected account credentials against the selected cloud-based service provider to determine whether the information provided in account information fields 622 is valid.

Navigation button(s) 626 include selectable buttons configured to move to the next pane in the workflow. Navigation button(s) 626 may only become available when the requisite amount of information is provided in the current view of cloud discovery management display 600. Selection of navigation button(s) 626 may cause the GUI view to change to the data center view of cloud discovery management display 600, as shown in FIG. 6D.

Pane manipulation buttons 628 may include buttons that either provide the user assistance in using, or the ability to change settings of, cloud discovery management display 600. As shown, pane manipulation buttons 628 include a search feature, chat feature, help feature, and settings feature. These features may relate to other services available to maintain managed network 300 and may not be specific to cloud discovery management display 600.

In operation, once a user has entered the requisite account information, the user may select test account button 624. As noted above, selection of test account button 624 may validate account information 614 with the selected cloud-based service.

Figure 6B:
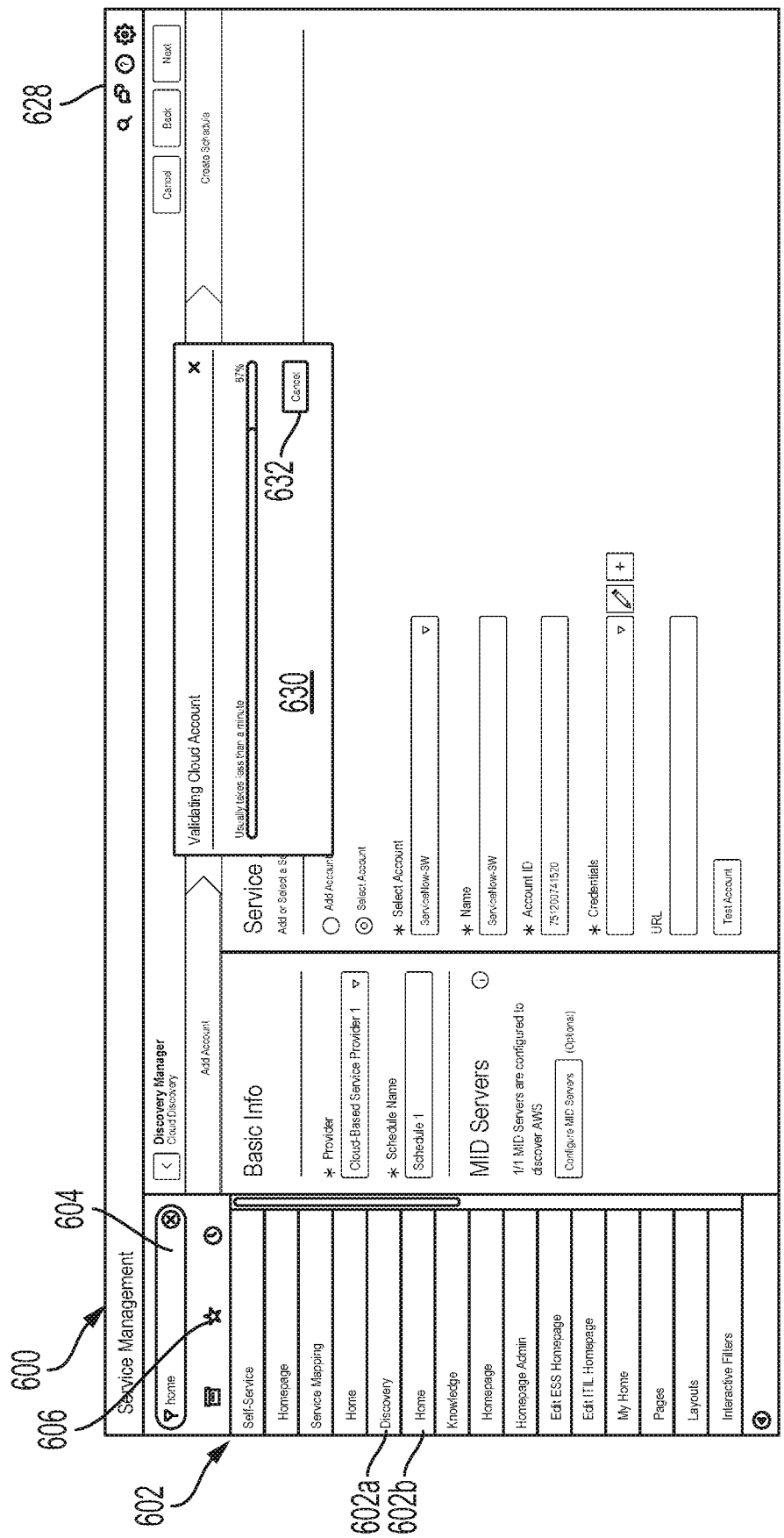
FIG. 6B depicts a validation pane of the cloud discovery management display, in accordance with example embodiments.

FIG. 6B depicts a validation view of cloud discovery management display 600. This view may include validation element 630 and cancel button 632. Validation element 630 may include a bar that provides a visual progress indication to the user. The visual progress indication may include a representation of the credential validation process. For example, selection of test account button 624 may cause the computational instance to remotely log on to the cloud-based service provider (through a proxy server or directly) using the provided userid and credentials. Cancel button 632 may cancel the validation process and return the user to the account view of cloud discovery management display 600. Once the validation process is complete, validation element 630 may automatically close. The results of the validation process may be displayed (not shown in FIG. 6B) under test account button 624 in the form of a text indication, such as "Validation Successful," "Credentials Valid," or an equivalent indication. In operation, once the validation of account credentials of account information 614 is complete, a subaccount view may be available in cloud discovery management display 600.

Completing this validation before defining a schedule for cloud discovery may be beneficial as it requires a user to verify that the entered account credentials are valid before scheduling cloud discovery. For example, if a validation attempt fails, which would have resulted in cloud discovery failure, the user may have another opportunity to enter valid credentials, saving time and resources. When cloud discovery is carried out after walking a user through the validation process, it is more likely to complete successfully, thus increasing the reliability of the overall process.

Figure 6C:
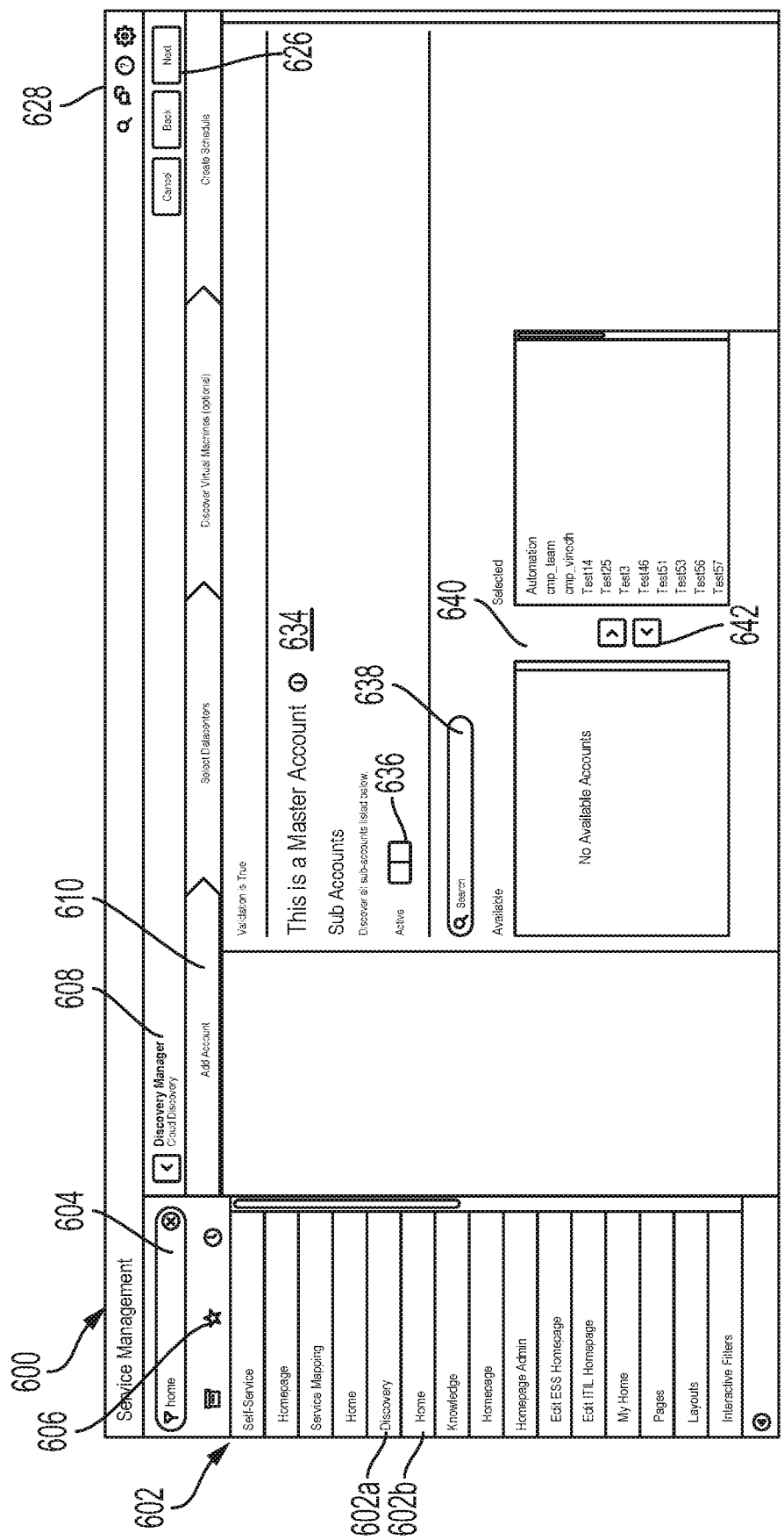
FIG. 6C depicts a subaccount pane of the cloud discovery management display, in accordance with example embodiments.
Figure 6D:
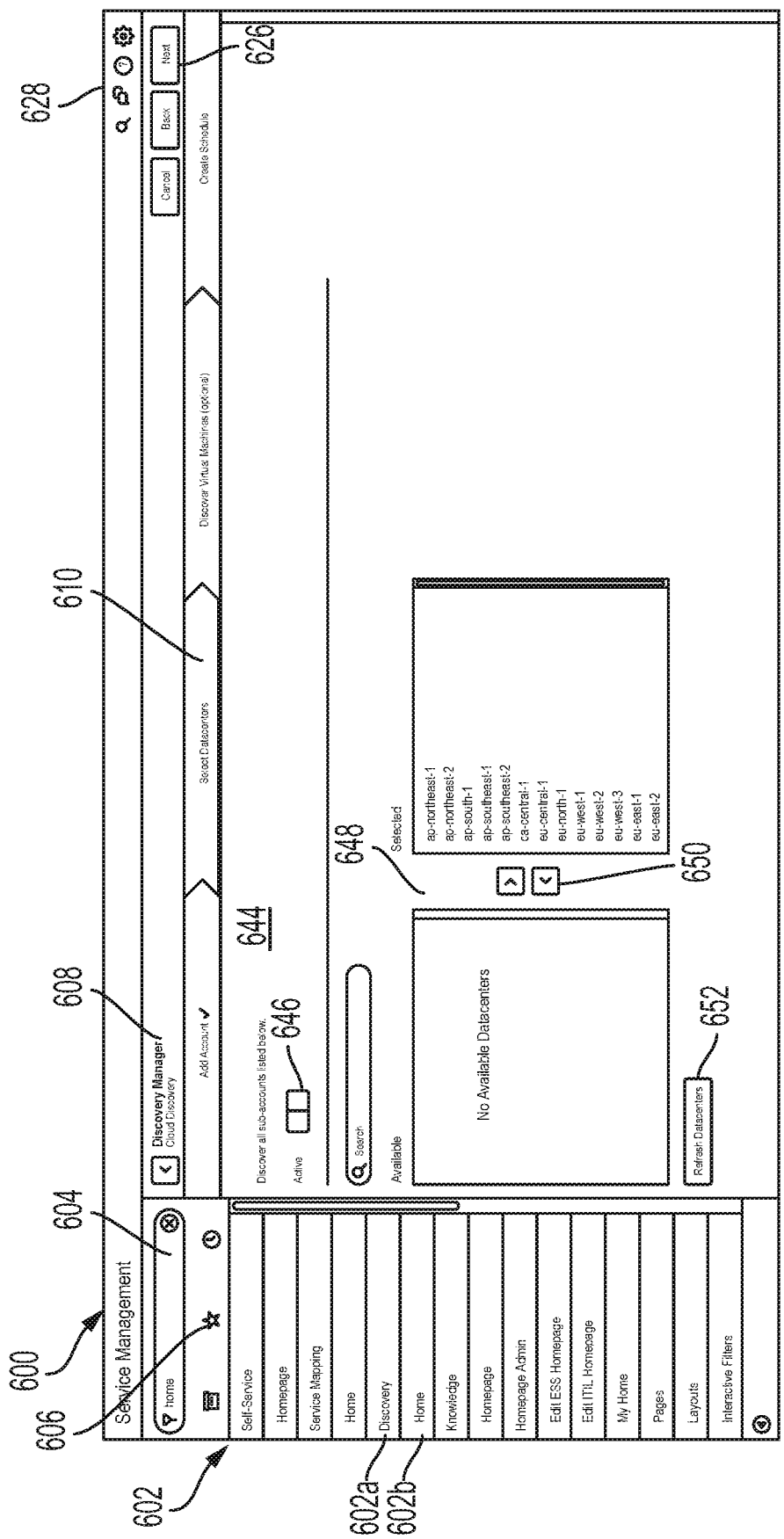
FIG. 6D depicts a datacenter management pane of the cloud discovery management display, in accordance with example embodiments.

FIG. 6C depicts such a subaccount view of cloud discovery management display 600. The subaccount view may be accessed via a scroll bar from the view shown in FIG. 6A. The subaccount view may include subaccount information 634, toggle 636, search bar 638, account lists 640, and account manipulator buttons 642.

Subaccount information 634 may indicate whether the account credentials correspond to a master account or subaccount. A master account may be an administrative account with a number of subaccounts linked to it, and a subaccount may be an account that is associated with, and subservient to, a master account.

Toggle 636 may be a user-selectable toggle that allows a user to specify, if the validated account is a master account, whether to perform cloud discovery on one or more subaccounts linked to the master account.

Search bar 638 may be a user-fillable text box that allows a user to search for particular subaccounts linked to a master account for which to perform discovery. For example, if a user enters a subaccount name into search bar 638, account lists 640 may be filtered to display subaccounts that satisfy the search term entered.

Account lists 640 may be lists of subaccounts that are available to be selected for discovery. Account lists 640 may be broken down into an "Available" list and a "Selected" list. Subaccounts in the "Available" list may correspond to accounts that are available to be selected for use in discovery, while subaccounts in the "Selected" list may correspond to accounts that have already been selected for use in discovery.

Account manipulator buttons 642 may be user-selectable buttons that allow a user to move selected accounts between the "Available" and "Selected" lists in account lists 640. This functionality may allow a user to specify exactly which subaccounts are to be used for cloud discovery.

In operation, if a user turns toggle 636 on, all available subaccounts may be moved to the "Selected" list in account lists 640. This may be beneficial because it allows the user to quickly and efficiently select all subaccounts for use in discovery. In contrast, if a user turns toggle 636 off, the subaccounts may be listed in the "Available" list of account lists 640. From this point, a user can select subaccounts for discovery one-by-one. This method of selection may be beneficial because a user may only want to perform discovery using a few select subaccounts.

Figure 6E:
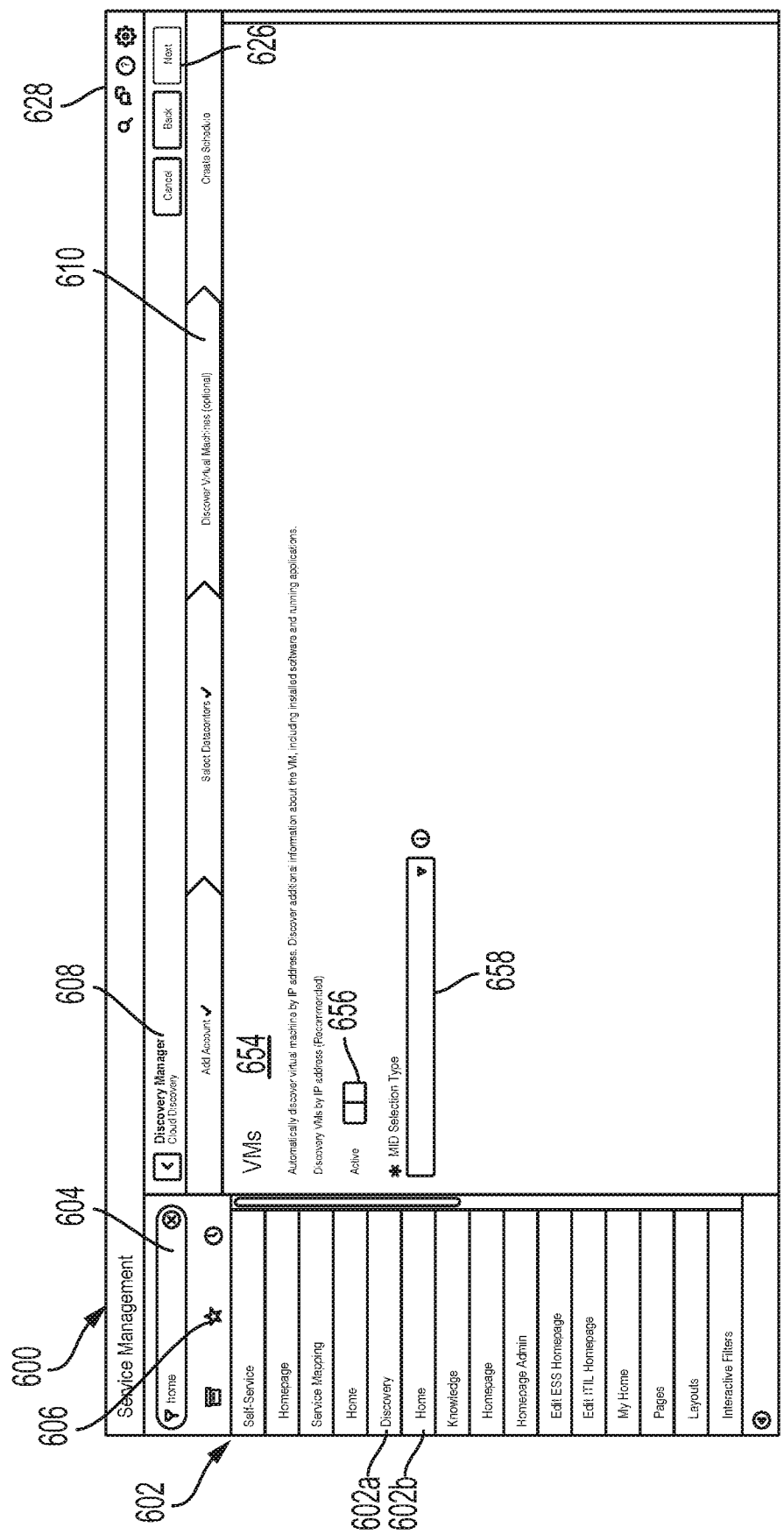
FIG. 6E depicts a virtual machine discovery pane of the cloud discovery management display, in accordance with example embodiments.

After the user has specified the accounts for use in discovery, the user may select the "Next" button in navigation button(s) 626, which may display a datacenter management pane of cloud discovery management display 600 shown in FIG. 6D. Selection of the "Next" button may also cause the GUI to display a visual marker that indicates the account selection stage is complete. This visual marker may be displayed as a check mark next to the stage in navigation indicators 610, as shown in FIGS. 6D and 6E.

The datacenter management pane may include datacenter information 644, such as toggle 646, datacenter lists 648, datacenter manipulator buttons 650, and refresh datacenters button 652. A datacenter may include a cluster of computing resources at a particular location or region accessible to managed network 300.

Toggle 646 may be a user-selectable toggle that allows a user to quickly and effectively select all datacenters through which to perform cloud discovery.

Datacenter lists 648 may be lists of datacenters that are available to be selected for discovery. The datacenters that appear in datacenters lists 648 are datacenters associated with the selected cloud-based service provider to which managed network 300 has access. As noted above, cloud discovery is used to determine the computing resources available at the datacenters for the cloud-based service providers. Datacenter lists 648 may be broken down into an "Available" list and a "Selected" list. Datacenters in the "Available" list may correspond to datacenters that are available to be selected for discovery, while datacenters in the "Selected" list may correspond to datacenters that have already been selected for discovery.

Datacenter manipulator buttons 642 may be user-selectable buttons that allow a user to move selected datacenters between the "Available" and "Selected" lists in datacenter lists 648. This functionality may allow a user to specify in which datacenters cloud discovery is to be performed.

Refresh datacenters button 652 may include a user-selectable button that refreshes datacenter lists 648 to display an updated list of available datacenters for discovery. The refresh datacenters button 652, similar to account validation, may quickly and efficiently obtain an updated list of datacenters available for discovery. For example, if a user selects refresh datacenters button 652, the computational instance accessing cloud discovery management display 600 may send a request to the cloud-based service provider. In response, the cloud-based service provider may respond with an inventory of available datacenters for discovery. This list may then be displayed in the "Available" list of datacenter lists 648.

In operation, if a user turns toggle 646 on, all available datacenters may be moved to the "Selected" list in datacenter lists 648. This may be beneficial because it allows the user to quickly and efficiently select all datacenters to discover. In contrast, if a user turns toggle 646 off, the datacenters may be listed in the "Available" list of datacenter lists 648. From this point, a user can select datacenters to discover one-by-one. This method of selection may be beneficial because a user may only want to perform discovery on a few select datacenters, such as datacenters in a particular geographical region. After the user has specified the datacenters to discover, the user may select the "Next" button in navigation button(s) 626, which may display a virtual machine discovery pane of cloud discovery management display 600 shown in FIG. 6E.

FIG. 6E depicts a virtual machine discovery pane of cloud discovery management display 600. The virtual machine discovery pane may include virtual machine information 654, which may include toggle 656, and server selection type 658.

Virtual machine information 654 may include discovery information related to virtual machines provided by the cloud-based service provider. Toggle 656 may be a user-selectable toggle that allows a user to indicate whether to discover virtual machines connected to the cloud-based service provider.

Server selection type 658 may include a user-selectable drop down menu that provides server types for which to discovery virtual machines. Server selection type 658 may only be available when toggle 656 is activated. Server selection type 658 may include selection options (not shown) such as "Automatic," "Cluster," or "Specific."

In operation, once a user activates toggle 656 and selects a server type in server selection type 658, the user can select "Next" in navigation button(s) 626. Selection of "Next" in FIG. 6E may guide the user to a detailed schedule pane.

Figure 6F:
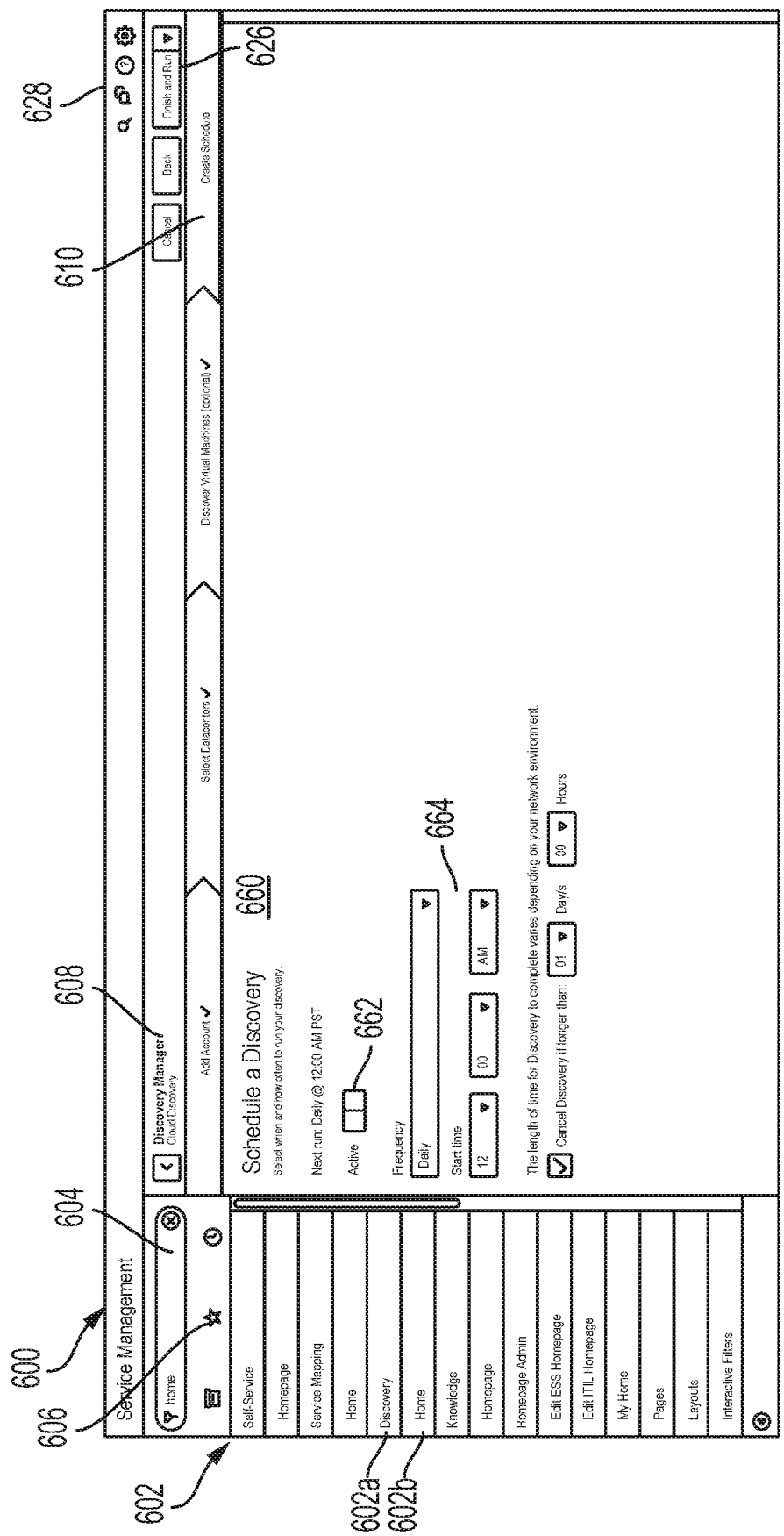
FIG. 6F depicts a detailed schedule pane of the cloud discovery management display, in accordance with example embodiments.

FIG. 6F depicts the detailed schedule pane of cloud discovery management display 600. The detailed schedule pane may include discovery scheduler 660 which includes toggle 662 and schedule information 664.

Toggle 662 may be a user-selectable toggle that allows a user to specify whether to activate a scheduled discovery. Toggle 662, when activated, may cause cloud discovery management display 600 to display schedule information 664.

Schedule information 664 may contain user-definable fields and menus to allow a user to specify the frequency, start time, and cut-off length for cloud discovery. The frequency information may be provided by a user via a drop-down menu that allows a user to specify a frequency of "Daily," "Weekly," or "Monthly." The start time of discovery may be provided by a user via another drop-down menu that allows a user to specify an exact hour and minute of the day to begin discovery. The cut-off length may be provided by a user via yet another drop down menu and may correspond to the amount of time discovery should run before it is proactively terminated. This may be beneficial because if discovery runs longer than the user-specified amount of time, some error may have occurred, which indicates discovery should be halted.

In operation, once a user has provided schedule information 664, the user may select "Finish and Run" in navigation button(s) 626. Upon selection, discovery may be performed on the selected datacenters of the selected cloud-based service provider using the account credentials provided by the user.

While the previous discussion implies that panes of the cloud discovery workflow should be presented in the order in which they were described (e.g., from the pane of FIG. 6A, then to that of FIG. 6B, then to that of FIG. 6C, then to that of FIG. 6D, then to that of FIG. 6E, and then to that of FIG. 6F), this need not be the case. While the described ordering has the advantages discussed above, other orderings of these and/or other panes may be used in similarly effective workflows.

VI. Example Operations

Figure 7:
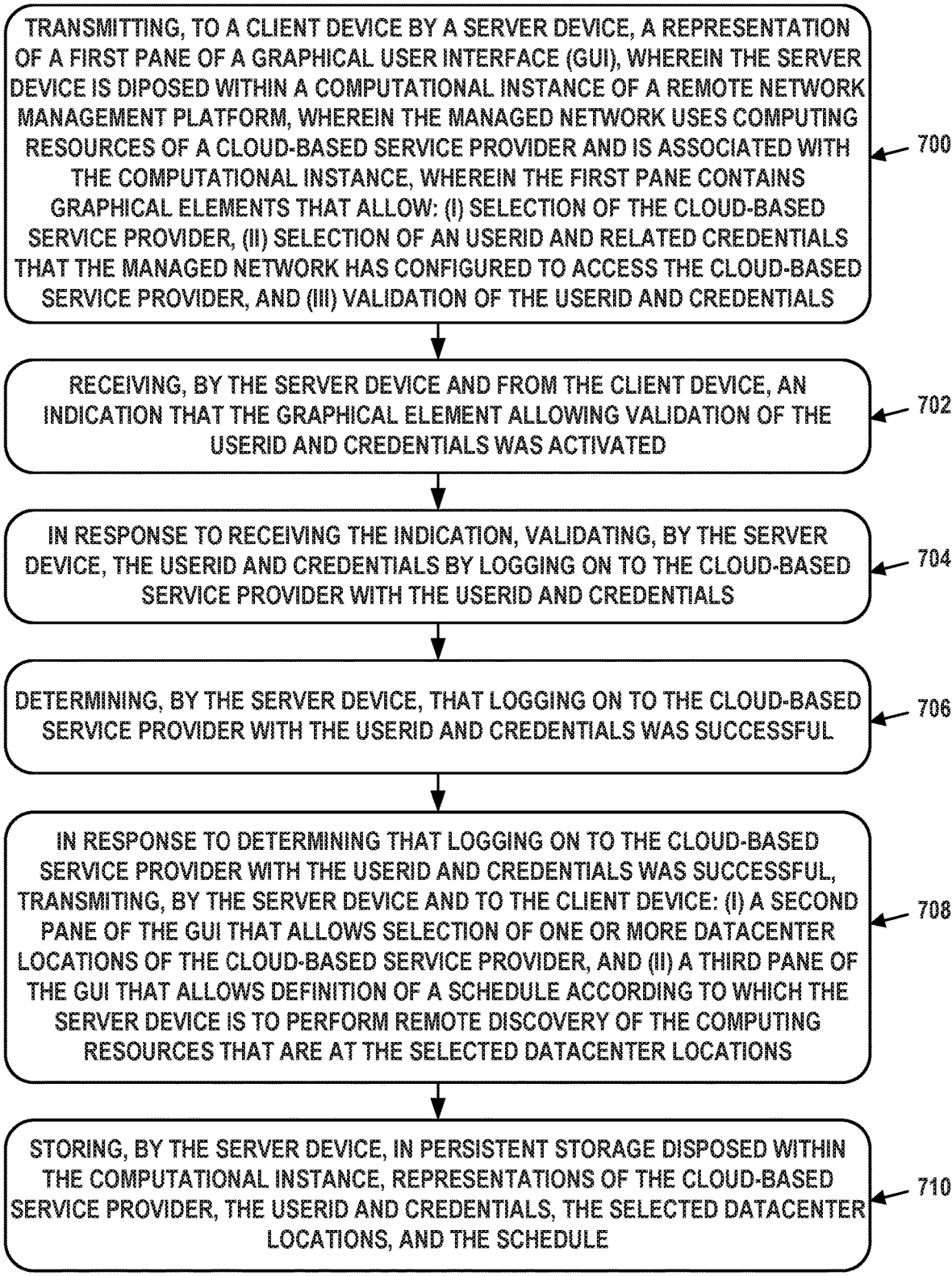
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 of FIG. 7 involves transmitting, to a client device by a server device, a representation of a first pane of a GUI. The server device is disposed within a computational instance of a remote network management platform. A managed network uses computing resources of a cloud-based service provider and is associated with the computational instance. The first pane contains graphical elements that allow: (i) selection of the cloud-based service provider, (ii) selection of a userid and related credentials that the managed network has configured to access the cloud-based service provider, and (iii) validation of the userid and credentials.

Block 702 involves receiving, by the server device and from the client device, an indication that the graphical element allowing validation of the userid and credentials was activated.

Block 704 involves, in response to receiving the indication, validating, by the server device, the userid and credentials by logging on to the cloud-based service provider with the userid and credentials.

Block 706 involves, determining, by the server device, that logging on to the cloud-based service provider with the userid and credentials was successful.

Block 708 involves in response to determining that logging on to the cloud-based service provider with the userid and credentials was successful, transmitting, by the server device and to the client device: (i) a second pane of the GUI that allows selection of one or more datacenter locations of the cloud-based service provider, and (ii) a third pane of the GUI that allows definition of a schedule according to which server device is to perform remote discovery of the computing resources that are at the selected datacenter locations.

Block 710 involves storing, by the server device, in persistent storage disposed within the computational instance, representations of the cloud-based service provider, the userid and credentials, the selected datacenter locations, and the schedule.

Some embodiments involve performing, in accordance with the schedule, remote discovery of the computing resources that are at the selected datacenter locations, and storing, in the persistent storage, representations of the discovered computing resources.

In some embodiments, proxy server software is disposed in the managed network by which the one or more server devices perform the logging on to the cloud-based service provider and the remote discovery of the computing resources.

In some embodiments, the computing resources include one or more of processing resources, storage resources, software application resources, or virtual machine resources.

Some embodiments involve, in response to determining that logging on to the cloud-based service provider with the userid and credentials was successful; transmitting, to the client device, a fourth pane of the GUI that allows definition of virtual machines of the selected datacenter locations; and storing, in the persistent storage, the definition of the virtual machines.

In some embodiments, the first pane further contains graphical elements that allow selection of a sub-userid that the managed network has configured to access the cloud-based service provider, where the sub-userid is associated with the userid.

In some embodiments, validating the userid and credentials by logging on to the cloud-based service provider with the userid and credentials is performed by the proxy server software.

In some embodiments, the computing resources include one or more of processing resources, storage resources, software application resources, or virtual machine resources.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage disposed within a computational instance of a remote network management platform, wherein the computational instance is dedicated to a managed network, and wherein the managed network uses computing resources of a cloud-based service provider; and
    one or more server devices disposed within the computational instance and configured to:

transmit, to a client device associated with the managed network, a representation of a first pane of a graphical user interface (GUI), wherein the first pane contains graphical elements that allow: (i) selection of the cloud-based service provider, (ii) selection of a userid and related credentials that the managed network has configured to access the cloud-based service provider, and (iii) validation of the userid and credentials;

receive, from the client device, an indication that the graphical element allowing validation of the userid and credentials was activated;

in response to receiving the indication, validate the userid and credentials by logging on to the cloud-based service provider with the userid and credentials;

determine that logging on to the cloud-based service provider with the userid and credentials was successful;

in response to determining that logging on to the cloud-based service provider with the userid and credentials was successful, transmit, to the client device: (i) a second pane of the GUI that allows selection of one or more datacenter locations of the cloud-based service provider, and (ii) a third pane of the GUI that allows definition of a schedule according to which the one or more server devices are to perform remote discovery of the computing resources that are at the selected datacenter locations; and store, in the persistent storage, representations of the cloud-based service provider, the userid and credentials, the selected datacenter locations, and the schedule.

2. The system of claim 1, wherein the one or more server devices are further configured to:

perform, in accordance with the schedule, remote discovery of the computing resources that are at the selected datacenter locations; and store, in the persistent storage, representations of the discovered computing resources.

3. The system of claim 2, further comprising:

proxy server software disposed in the managed network by which the one or more server devices perform the logging on to the cloud-based service provider and the remote discovery of the computing resources.

4. The system of claim 3, wherein determining that logging on to the cloud-based service provider with the userid and credentials was successful is performed by the proxy server software.

5. The system of claim 1, wherein the computing resources include one or more of processing resources, storage resources, software application resources, or virtual machine resources.

6. The system of claim 1, wherein the one or more server devices are further configured to:

in response to determining that logging on to the cloud-based service provider with the userid and credentials was successful, transmit, to the client device: a fourth pane of the GUI that allows definition of virtual machines of the selected datacenter locations; and store, in the persistent storage, the definition of the virtual machines.

7. The system of claim 1, wherein the first pane further contains graphical elements that allow selection of a sub-userid that the managed network has configured to access the cloud-based service provider, wherein the sub-userid is associated with the userid.

8. A method comprising:

transmitting, to a client device by a server device, a representation of a first pane of a graphical user interface (GUI), wherein the server device is disposed within a computational instance of a remote network management platform, wherein a managed network uses computing resources of a cloud-based service provider and is associated with the computational instance, wherein the first pane contains graphical elements that allow: (i) selection of the cloud-based service provider, (ii) selection of a userid and related credentials that the managed network has configured to access the cloud-based service provider, and (iii) validation of the userid and credentials;

receiving, by the server device and from the client device, an indication that the graphical element allowing validation of the userid and credentials was activated;

in response to receiving the indication, validating, by the server device, the userid and credentials by logging on to the cloud-based service provider with the userid and credentials;

determining, by the server device, that logging on to the cloud-based service provider with the userid and credentials was successful;

in response to determining that logging on to the cloud-based service provider with the userid and credentials was successful, transmitting, by the server device and to the client device: (i) a second pane of the GUI that allows selection of one or more datacenter locations of the cloud-based service provider, and (ii) a third pane of the GUI that allows definition of a schedule according to which the server device is to perform remote discovery of the computing resources that are at the selected datacenter locations; and storing, by the server device, in persistent storage disposed within the computational instance, representations of the cloud-based service provider, the userid and credentials, the selected datacenter locations, and the schedule.

9. The method of claim 8, further comprising:

performing, in accordance with the schedule, remote discovery of the computing resources that are at the selected datacenter locations; and storing, in the persistent storage, representations of the discovered computing resources.

10. The method of claim 9, further comprising:

proxy server software disposed in the managed network by which the server device performs the logging on to the cloud-based service provider and the remote discovery of the computing resources.

11. The method of claim 10, wherein determining that logging on to the cloud-based service provider with the userid and credentials was successful is performed by the proxy server software.

12. The method of claim 10, wherein the computing resources include one or more of processing resources, storage resources, software application resources, or virtual machine resources.

13. The method of claim 8, further comprising in response to determining that logging on to the cloud-based service provider with the userid and credentials was successful, transmitting, to the client device: a fourth pane of the GUI that allows definition of virtual machines of the selected datacenter locations; and storing, in the persistent storage, the definition of the virtual machines.

14. The method of claim 8, wherein the first pane further contains graphical elements that allow selection of a sub-userid that the managed network has configured to access the cloud-based service provider, wherein the sub-userid is associated with the userid.

15. An article of manufacture including a non-transitory computer-readable medium, having stored thereon program instructions that, upon execution by a computing system, cause the computing system to perform operations comprising:

transmitting, to a client device by a server device, a representation of a first pane of a graphical user interface (GUI), wherein the server device is disposed within the computing system, wherein a managed network uses computing resources of a cloud-based service provider and is associated with the computing system, wherein the first pane contains graphical elements that allow: (i) selection of the cloud-based service provider, (ii) selection of a userid and related credentials that the managed network has configured to access the cloud-based service provider, and (iii) validation of the userid and credentials;

receiving, by the server device and from the client device, an indication that the graphical element allowing validation of the userid and credentials was activated;

in response to receiving the indication, validating, by the server device, the userid and credentials by logging on to the cloud-based service provider with the userid and credentials;

determining, by the server device, that logging on to the cloud-based service provider with the userid and credentials was successful;

in response to determining that logging on to the cloud-based service provider with the userid and credentials was successful, transmitting, by the server device and to the client device: (i) a second pane of the GUI that allows selection of one or more datacenter locations of the cloud-based service provider, and (ii) a third pane of the GUI that allows definition of a schedule according to which the computing system is to perform remote discovery of the computing resources that are at the selected datacenter locations; and storing, by the server device, in persistent storage disposed within the computing system, representations of the cloud-based service provider, the userid and credentials, the selected datacenter locations, and the schedule.

16. The article of manufacture of claim 15, wherein the operations further comprise:

performing, in accordance with the schedule, remote discovery of the computing resources that are at the selected datacenter locations; and storing, in the persistent storage, representations of the discovered computing resources.

17. The article of manufacture of claim 16, wherein proxy server software disposed in the managed network by which the computing system performs the logging on to the cloud-based service provider and the remote discovery of the computing resources.

18. The article of manufacture of claim 15 wherein the computing resources include one or more of processing resources, storage resources, software application resources, or virtual machine resources.

19. The article of manufacture of claim 15, wherein the operations further comprise:

in response to determining that logging on to the cloud-based service provider with the userid and credentials was successful, transmitting, to the client device: a fourth pane of the GUI that allows definition of virtual machines of the selected datacenter locations; and storing, in the persistent storage, the definition of the virtual machines.

20. The article of manufacture of claim 15, wherein the first pane further contains graphical elements that allow selection of a sub-userid that the managed network has configured to access the cloud-based service provider, wherein the sub-userid is associated with the userid.

* * * * *